United States Patent
Heinrich

(10) Patent No.: US 9,540,119 B1
(45) Date of Patent: Jan. 10, 2017

(54) REMOTELY PILOTED AIRCRAFT TELEMETRY RECORDING USING THE COMMAND AND CONTROL DATA LINK SYSTEM AND RELATED METHOD

(71) Applicant: Richard E. Heinrich, Marion, IA (US)

(72) Inventor: Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 14/710,025

(22) Filed: May 12, 2015

(51) Int. Cl.
B64D 45/00 (2006.01)
H04W 4/02 (2009.01)

(52) U.S. Cl.
CPC ............ B64D 45/00 (2013.01); H04W 4/028 (2013.01); *B64D 2045/0065* (2013.01)

(58) Field of Classification Search
CPC .............................. B64D 45/00; H04W 4/028
See application file for complete search history.

(56) References Cited

U.S. PATENT DOCUMENTS

2007/0222665 A1\* 9/2007 Koeneman .......... G01S 13/9303
342/29

\* cited by examiner

*Primary Examiner* — Basil T Jos
(74) *Attorney, Agent, or Firm* — Angel N. Gerdzhikov; Donna P. Suchy; Daniel M. Barbieri

(57) ABSTRACT

A system and related method for reception and storage of a command and control (C2) data link between a control station and a Remotely Piloted Vehicle (RPV) for RPV operation. From the C2 data link, the system receives and stores command signals generated by the control station as well as telemetry data associated with and generated by the RPV. The system operates to compare the received telemetry data to 1) the command signal to assure RPV compliance, 2) stored information associated with the RPV to determine a RPV anomaly, and 3) stored information associated with a high value asset (HVA). Should the comparison reveal a threat to the RPV or HVA, the system alerts an authority to mitigate the threat. The system and method aggregates data associated with specific RPV type or operator to support several safety initiatives, methods used to perform predictive maintenance planning, and accident recreation and investigation.

20 Claims, 8 Drawing Sheets

REMOTELY PILOTED AIRCRAFT TELEMETRY RECORDING USING THE COMMAND AND CONTROL DATA LINK SYSTEM AND RELATED METHOD

FIELD OF THE INVENTION

Embodiments of the inventive concepts disclosed herein relate generally to recording telemetry data and state data associated with a remotely piloted vehicle. More particularly, embodiments of the inventive concepts disclosed herein provide a system and related method for reception/interception and storage of control data, telemetry data and a plurality of state parameters associated with control and status of an aerial vehicle.

BACKGROUND

State information may include a plurality of pieces of information relating to the status of an aerial vehicle. State information may include flight crew avionics input, flight control surface deflection, engine parameters (RPM, EGT), ambient cockpit voice communications, radio frequency communications and additional avionics parameters.

Traditional commercial air transport category aircraft may employ a flight data recorder mounted within the aerial vehicle to record such state information. These traditional data recorders inherently possess limitations in certain situations. Should an aerial vehicle be lost at sea, the traditional data recorders may remain unrecoverable at the bottom of the ocean for periods of time after immersion. Limited battery life in addition to salt water immersion may limit the effectiveness of traditional data recorders.

Flight data recorders and cockpit voice recorders mounted onboard air transport category aircraft may also record and store various parameters associated with the command and operation of the aircraft. However, there is no similar data recorder device available to a Remotely Piloted Vehicle (RPV) for storage of state and command information. Particularly due to the size and weight requirements of most RPVs, limited or no onboard space and weight is available to install a device capable of recording and storage of state information associated with the RPV.

Traditional Flight Operations Quality Assurance (FOQA) and Maintenance Operations Quality Assurance (MOQA) data may be extracted from traditional flight data recorders for follow on analysis and use to determine 1) operational trend data for training purposes and 2) maintenance trend data for pre-failure preventative maintenance. This cumbersome extraction requires a physical connection for maintenance personnel to board the aerial vehicle, download the FOQA/MOQA data to a portable drive and physically transfer the FOQA/MOQA data from the aerial vehicle for follow on analysis.

Further, in the event of a catastrophic loss of an aircraft, forces experienced during the loss events may cause the flight data recorder as well as the cockpit voice recorder to become damaged beyond repair and some or all of the recorded data may be lost. This damage may leave accident investigation teams without usable data from which they may reconstruct events prior to such a catastrophic loss.

The miniature size and complexity of the avionics systems for RPVs avionics systems may not allow traditional onboard recording of state data and command data usable for RPV safety assurance, accident investigation and health and maintenance architectures. A need exists for collection of state and command information necessary for safety analysis, pilot training, currency, etc. Further, a need remains for a solution to this critical gap in remote recordation and storage of command and control as well as aircraft state information related to manned and unmanned aerial vehicles.

SUMMARY

In one aspect, embodiments of the inventive concepts disclosed herein are directed to a system for remotely piloted aerial vehicle telemetry recording, the system may include a remote data recorder including a wired port and a wireless port. The remote data recorder may be configured for: detecting at least one Command and Control (C2) signal destined for at least one Remotely Piloted Vehicle (RPV) located remotely from the remote data recorder, the C2 signal transmitted via one of: a wired connection and a wireless radio frequency (RF) signal, the C2 signal operatively connecting a control station and the at least one RPV. The remote data recorder may receive a command signal via one of: the wired port and the wireless port, the command signal 1) generated by the control station, 2) destined for the at least one RPV, 3) including at least one associated RPV command, and 4) a portion of the C2 signal.

The remote data recorder may also receive a telemetry data signal via one of: the wired port and the wireless port, the telemetry data signal 1) generated by the at least one RPV, 2) destined for the control station, 3) including at least one associated RPV result, and 4) a portion of the C2 signal. Aa controller may be operatively coupled with the remote data recorder and with a memory, the memory storing non-transitory computer readable program code for processing the command signal and the telemetry data associated with the at least one RPV. The computer readable program code may include instructions for causing the controller to perform and direct steps.

The steps may include receiving the command signal and the telemetry data, receiving system parameters associated with at least one system onboard the at least one RPV, storing each of the command signal, the telemetry data, and the system parameters in the memory, comparing the at least one associated RPV result to 1) the at least one associated RPV command and 2) to the stored system parameters, determining a threat level associated with the at least one RPV, the threat level determined based on the comparing, and alerting an authority if the threat level rises above a predetermined threshold.

An additional embodiment of the inventive concepts disclosed herein may include a system wherein the at least one RPV is at least one of an unmanned aerial vehicle and a manned aerial vehicle and wherein the telemetry data includes at least one of a RPV position, a RPV altitude, a heading, a speed and status associated with at least one system onboard the at least one RPV.

An additional embodiment of the inventive concepts disclosed herein may include a system wherein the command signal and the at least one associated RPV command are generated by an operator of the control station.

An additional embodiment of the inventive concepts disclosed herein may include a system wherein the controller is further configured for: receiving and storing High Value Asset (HVA) information associated with at least one HVA external to the at least one RPV, comparing the HVA information to the telemetry data, and determining the threat level associated with the at least one RPV based on the comparing.

An additional embodiment of the inventive concepts disclosed herein may include a system wherein the threat level associated with the at least one RPV is associated with one of: 1) a threat to the at least one RPV, 2) a threat to the HVA external to the at least one RPV from a presence of the at least one RPV, 3) a threat to the at least one RPV from a system onboard the at least one RPV, and 4) a threat to a person onboard the at least one RPV.

An additional embodiment of the inventive concepts disclosed herein may include a system wherein comparing the at least one associated RPV command to the at least one associated RPV result further comprises a comparison of stored telemetry data with received telemetry data and a comparison of a RPV system desired performance with a RPV system current performance.

In a further aspect, embodiments of the inventive concepts disclosed herein are directed to a method for remotely piloted aerial vehicle telemetry recording, comprising: detecting, within a remote data recorder, at least one Command and Control (C2) signal destined for at least one Remotely Piloted Vehicle (RPV) located remotely from the remote data recorder, the detecting by a receiver offboard the at least one RPV, the remote data recorder configured with a wired port and a wireless port, the C2 signal operating within one of: a wired connection and a wireless radio frequency (RF) signal, the C2 signal operatively connecting a control station and the at least one RPV, receiving a command signal via one of: the wired port and the wireless port.

In embodiments, the command signal is 1) generated by the control station, 2) destined for the at least one RPV, 3) including at least one associated RPV command, and 4) a portion of the C2 signal, receiving a telemetry data signal via one of: the wired connection within the receiver and on the wireless RF signal via the receiver antenna. Also, the telemetry data signal may be 1) generated by the at least one RPV, 2) destined for the control station 3) including at least one associated RPV result, and 4) a portion of the C2 signal.

The method may receive the command signal and the telemetry data via a controller operatively coupled with the remote data recorder and with a memory, the memory storing non-transitory computer readable program code for processing the command signal and the telemetry data associated with the at least one RPV, the computer readable program code comprising instructions for causing the controller to perform and direct the steps of: receiving system parameters associated with at least one system onboard the at least one RPV, storing each of the command signal, the telemetry data, and the system parameters in the memory.

The method may compare the received at least one associated RPV result to 1) the at least one associated RPV command and 2) to the stored system parameters, determining a threat level associated with the at least one RPV, the threat level determined based on the comparing, and alerting an authority if the threat level rises above a predetermined threshold.

In a further aspect, embodiments of the inventive concepts disclosed herein are directed to a method for quality assurance tracking of an aerial vehicle comprising: detecting at least one Command and Control (C2) signal destined for at least one Remotely Piloted Vehicle (RPV), the C2 signal operatively connecting a control station and the at least one RPV, extracting from the detected C2 signal and storing to a memory, a command signal 1) generated by the control station, 2) destined for the at least one RPV, 3) including at least one associated RPV command, and 4) a portion of the C2 signal.

The method may also extract and store, from the detected C2 signal, a telemetry data signal 1) generated by the at least one RPV, 2) destined for the control station, 3) including at least one associated RPV result, and 4) a portion of the C2 signal, receiving and storing system parameters and operational parameters associated with at least one system onboard the at least one RPV, comparing the at least one associated RPV result to 1) the at least one associated RPV command and 2) to the stored system parameters, determining a threat level associated with the at least one RPV, the threat level determined based on the comparing, and alerting an authority if the threat level rises above a predetermined threshold.

An additional embodiment of the inventive concepts disclosed herein may include a method wherein the stored telemetry data is further aggregated by at least one of an aircraft type, an aircraft model, an aircraft manufacturer and a pilot training facility.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts disclosed herein, examples of which are illustrated in the accompanying drawings. The following description presents certain specific embodiments of the inventive concepts disclosed herein. However, these inventive concepts may be embodied in a multitude of different ways as defined and covered by the claims. In this description, reference is made to the drawings wherein like parts are designated with like numerals throughout.

Embodiments of the inventive concepts disclosed herein are directed to a system and related method for reception and storage of a command and control (C2) data link between a control station and an aerial vehicle such as a Remotely Piloted Vehicle (RPV). The C2 data link may be designed for control and operation of the aerial vehicle from the control station. Within the C2 data link, the system herein receives and stores command signals from the control station as well as telemetry data associated with the aerial vehicle. In one embodiment, the system operates to receive and store the command data and telemetry data and compare the received telemetry data to the command data to ensure 1) positive reception of the command and 2) safe and positively controlled operation of the RPV from the control station.

In capturing the command signals and telemetry data, the systems herein may compare captured telemetry data to captured commanded signals to determine 1) if the command was received by the RPV and 2) if the RPV properly responded to the command. The systems herein may operate as a safety monitor of the RPV system.

In addition to the above, the systems and methods herein may compare the received telemetry data to 1) stored telemetry data to ensure the RPV is operating according to historical trends and 2) information associated with a high value asset (HVA) to determine if the RPV may pose a threat to the HVA. Should the comparisons reveal a threat to the RPV or to the HVA, the system may alert an authority to mitigate the threat through corrective action and post processing of the data to determine possible actions to counter the threat.

In addition, the system and method may aggregate data associated with specific aerial vehicle type or operator to support several safety initiatives, methods used to perform predictive maintenance planning and accident recreation and investigation.

REFERENCE CHART

Figure 1:
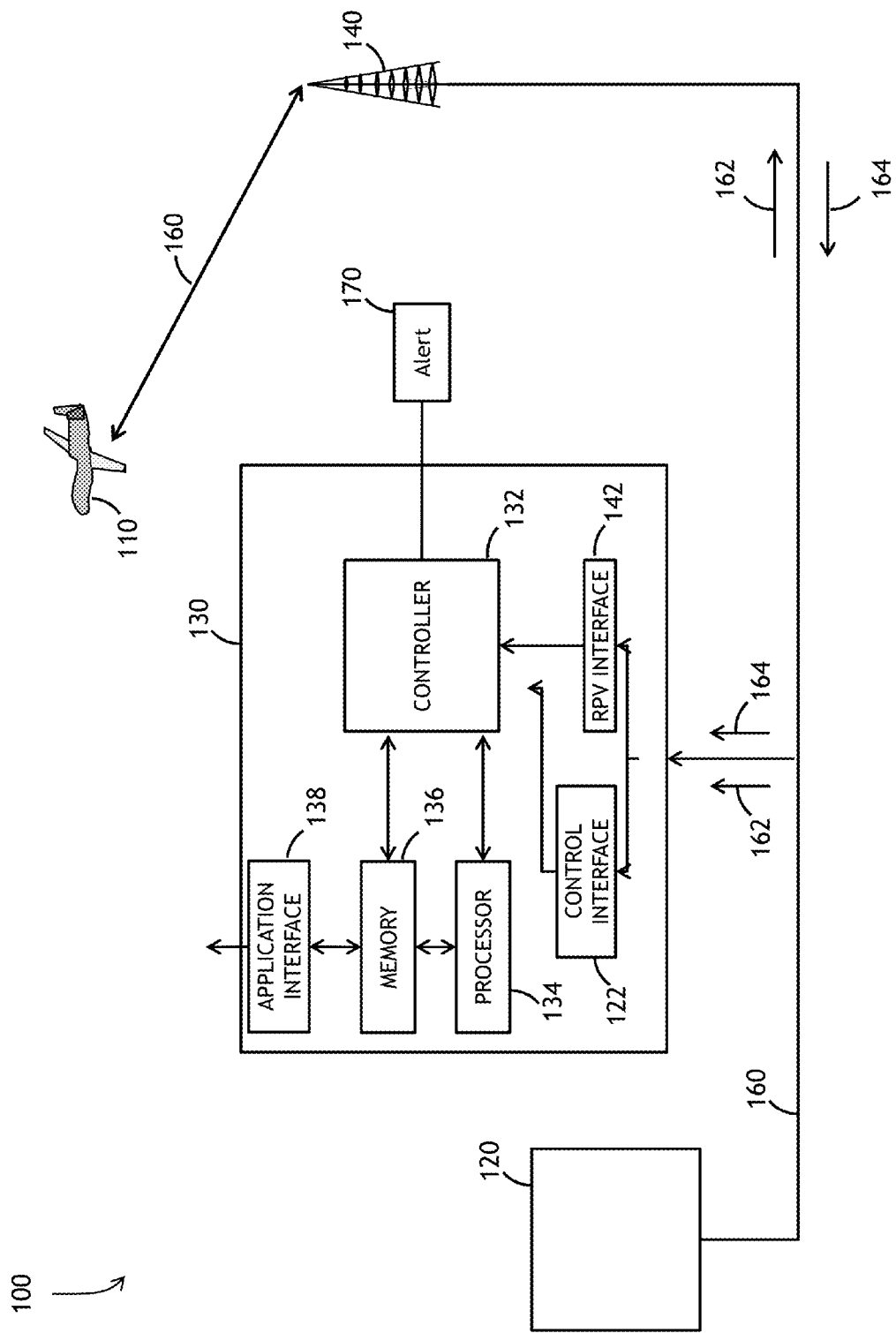
FIG. 1 is a diagram of an exemplary system for RPV safety assurance via control and telemetry data recording in accordance with an embodiment of the inventive concepts disclosed herein.

No. Description
100 System
110 Remotely Piloted Vehicle (RPV)
120 Control Station
122 Ground Control Interface
130 Remote Data Recorder
132 Controller
134 Processor
136 Memory
138 Application Interface
140 Terrestrial point to point Antenna
142 Remotely Piloted Vehicle Interface
150 Satellite Relay
170 Alert
160 Command and Control (C2) Data Link
162 Command Signals
164 Telemetry Data
200 Wireless Configuration
210 Local Remotely Piloted Vehicle (LRPV)
212 LRPV Telemetry Signal
220 Control Station Antenna
230 Remote Data Recorder Antenna
232 Remote Data Recorder RF Transmitter Receiver
242 Network Adapter
250 Network
340 Transoceanic Antenna
400 Covert Recordation
500 High Value Asset Configuration
510 Second RPV
520 Control Tower
530 Networked Remote Data Recorder
550 High Value Asset
602 Scan/Detect
604 Receive Command Signal
606 Receive Telemetry Data
608 Store to memory the Command and Telemetry Data
610 Receive and Store RPV System Information/HVA Information
612 Compare Systems Information and Telemetry Data
614 Compare Telemetry Data to Command Signals
616 Threat to RPV or to HVA
618 Alert Authority
622 Tune a RF Receiver
632 Receive a Network Handoff
634 Within tolerance Referring to FIG. 1, a diagram of an exemplary system for RPV safety assurance via control and telemetry data recording in accordance with an embodiment of the inventive concepts disclosed herein is shown. The system 100 for RPV safety assurance may include a remote data recorder 130 configured for reception and recordation of a command and control (C2) data link 160. Embodiments of the system 100 may operate to receive and record a plurality of information contained within the C2 data link 160 between a control station 120 and a remotely piloted vehicle (RPV) 110. Within the C2 data link 160, command signals 162 generated by the control station 120 and telemetry data 164 generated by the RPV 110 may be of particular value to an operator of the system 100.

The telemetry data 164 may be generally defined as parameters associated with the state of the RPV 110 and systems thereon. The command signals 162 may be generally defined as those commands issued from the (ground) control station 120 directed to the RPV 110 for the operation of the RPV 110. The C2 data link 160 may include bidirectional signals including 1) command signals 162 sent from the control station 120 to the RPV 110 and 2) telemetry data 164 sent from the RPV 110 to the control station 120.

The command signals 162 may include an associated RPV command such as a commanded flight control inputs (e.g., a specific aileron input to command a specific angle of bank), commanded power settings, commanded track and navigation data and commanded weapons release, etc. The telemetry data 164 may include an associated RPV result incompliance with the associated RPV command. The telemetry data may include parameters associated with the RPV 110 for example: actual flight control surface position, actual RPV power setting, actual weapons load, systems status, or systems built in test (BIT) data.

Each of the command signals 162 and the telemetry data 164 may exist as state exchanges (data bus activity) via the C2 data link 160 between the control station 120 and the RPV 110. This two way C2 data link 160 may provide data from which the state of the RPV 110 may be recreated. For example, correlation information sent from the RPV 110 to the control station, updates of aircraft state information, traffic awareness, flight control input, flight control deflection and C2 data link 160 performance may be some of the parameters available as part of the C2 data link 160 exchange. Generally, telemetry data 164 included in the C2 down links from the RPV 110 to the control center 120 may provide the platform state and C2 command signals 162 within uplinks from the control center 120 to the RPV 110 may provide pilot induced changes. This information may be similar to that captured by traditional flight data recorders on commercial aircraft.

The system 100 may record much greater detail than may be found in a traditional flight data recordation system by monitoring and capturing the data from the C2 data link 160 as well as additional information links between the control station 120 and the RPV 110 (e.g. a sensor data link). Systems disclosed herein may operate within single channel point-to-point operations as well as multi-point local and global worldwide networked operations.

Embodiments of the inventive concepts disclosed herein may receive and store bus activity between a pilot control within the control station 120 on the ground and the avionics onboard the RPV 110 in the air. Embodiments may sample the data bus between the RPV 110 and the control station 120 C2 data link 160 and operate to record all the telemetry data 164 and command signals 162 available.

The system 100 may also receive High Value Asset (HVA) information associated with a HVA external to the at least one RPV as well as system parameters associated with at least one system onboard the RPV. Discussed in greater detail below in FIG. 5, a HVA may include an asset of value where an authority may desire protection from the presence of the RPV 110.

The system 100 may compare the received telemetry data 164 including an associated RPV result with a command signal 162 including an associated RPV command to determine if the control station 120 is positively commanding operation of the RPV 110. A positive command indication may be the RPV result is directly in compliance with the RPV command. For example, should the RPV command be a climb from 8,000 feet to 9,000 feet, a positive indication that the control station 120 is in positive command of the RPV would include telemetry data 164 sent from the RPV via the C2 signal that the RPV was actually at 9,000 feet of altitude.

In addition, the system 100 may compare the received telemetry data to the stored system parameters. A controller 132 may operate to compare stored data to currently received data to determine if an anomaly is present within the currently received data. For example, during a plurality of previous flights, an engine temperature (e.g. exhaust gas temperature (EGT)) is maintaining an average of 350 degrees centigrade, and the currently received telemetry data indicates an EGT of 420 C, the system 100 may take action to notify a maintenance organization of the anomaly.

Further, the system 100 may receive HVA information associated with a HVA of concern. The HVA information may include for example, a static location of a building or runway, a dynamic location of a person or team of persons, and a value associated with the HVA. The system 100 may compare the received telemetry data to the HVA information and determine a threat level with associated with the RPV based on the comparison. For example, if the HVA is a building, the system 100 may use a RPV range from the building as a level of threat to the building. The closer the range the higher the threat level. For example, a range of 50 nautical miles (NM) may be a threat level 1, while a range of 20 NM may be a threat level 2, etc. As the threat level may rise to a predetermined threshold (here e.g., 30 miles range between the HVA and the RPV) the system 100 may alert an authority if the threat level rises above the 30 NM predetermined threshold.

In one embodiment, the remote data recorder 130 may operate to receive the C2 data link 160 and may include a control interface 122, the controller 132, a processor 134, a memory 136, an application interface 138, and a RPV interface 142. External to the system 100, a terrestrial point to point antenna 140 may be configured for line of sight transmission and reception of the C2 data link 160 with the RPV 110. Optionally, the controller 132 may be omitted from the remote data recorder 130 and the processor 134 may function to carry out the steps of the system 100.

In embodiments, the remote data recorder 130 may be configured to receive the C2 data link 160 from a manned ground control station 120 within a secure facility operating a distant RPV 110. For example, a military pilot may operate a distant RPV 110 (e.g., Reaper, Global Hawk, Wasp, Sentinel) from the manned secure facility where the C2 data link 160 may travel a great distance before being received by the RPV 110. At any point of the C2 data link 160, the remote data recorder 130 may operate to receive and record the desired data.

For example, the manned control station 120 may be physically located within a secure air base in North Dakota, while the RPV 110 may be operating in a remote area of the Indian Ocean. The remote data recorder 130 may also be physically located within the secure air base in North Dakota and preferably within the same building as the manned control station 120 as secure data may be present in the C2 data link 160. Alternatively, the remote data recorder 130 may be physically located nearby the terrestrial point to point antenna 140 and configured for recording as well as throughput of the C2 data link 160.

In one embodiment of the system 100, the command signals 162 of the C2 data link 160 may originate within the manned control station 120, enter the remote data recorder 130 via the control interface 122 and be received by the controller 132. While the command signals 162 may continue on to the RPV 110 via the terrestrial point to point antenna 140, the remote data recorder records each command signal and associated command.

Similarly, the telemetry data 164 may follow an opposite path originating and transmitted from the RPV 110, be routed via the terrestrial point to point antenna 140 to the RPV interface 142 and be received by the controller 132 for recording within the memory 136.

During recording of the C2 data link 160, including the command signals 162 and the telemetry data 164, the processor 134 may read non-transitory computer readable program code stored within the memory 136. The computer readable program code may cause the processor 134 to issue commands to the controller 132 to store desired parameters of the C2 data link to the memory 136. The controller 132 may determine a threat level associated with the RPV be of sufficient merit to warrant an alert 170 sent so that an operator may take corrective action.

The operator may also access the stored parameters from the memory 136 via the application interface 138. Conversely, the application interface 138 may be continuously connected to an application residing external to the remote data recorder 130. In this manner, the remote data recorder 130 may record and make available to the external application each desired parameter associated with the command signals 162 and the telemetry data 164.

In one embodiment, the remote data recorder may receive the telemetry data 164 from the RPV 110 and the command signals from the control station 110 and record one or more of the following (including, but not limited to) parameters:

| | |
|---|---|
| 1. | Time |
| 2. | Pressure Altitude |
| 3. | Indicated or Calibrated airspeed |
| 4. | Heading |
| 5. | Vertical Acceleration |
| 6. | Pitch Attitude |
| 7. | Roll Attitude |
| 8. | Manual Radio Transmitter Keying |
| 9. | Thrust/Power on each engine |
| 10. | Autopilot Engagement |
| 11. | Longitudinal Acceleration |
| 12. | Pitch controls position |
| 13. | Lateral control positions |
| 14. | Yaw control positions |
| 15. | Pitch control surfaces position |
| 16. | Lateral control surfaces position |
| 17. | Yaw control surfaces position |
| 18. | Lateral Acceleration |
| 19. | Pitch Trim Surface Position |
| 20. | Trailing Edge Flap Cockpit Control Selection |
| 21. | Leading Edge Flap Cockpit Control Selection |
| 22. | Each Thrust Reverser Position |
| 23. | Ground Spoiler Position or Speed Brake Selection |
| 24. | Outside Air Temperature or Total Air Temperature |
| 25. | Autopilot/Autothrottle/Auto Flight Control System Mode and Engagement Status |
| 26. | Radio Altitude |
| 27. | Localizer Deviation, MLS Azimuth, or GPS Lateral Deviation |
| 28. | Glideslope Deviation, MLS Elevation, or GPS Vertical Deviation |
| 29. | Marker Beacon Passage |
| 30. | Master Warning |
| 31. | Air/ground sensor |
| 32. | Angle of Attack |
| 33. | Hydraulic Pressure |
| 34. | Groundspeed |
| 35. | Ground proximity warning system |
| 36. | Landing Gear Position |
| 37. | Drift Angle |
| 38. | Wind Speed and Direction |
| 39. | Latitude and Longitude |
| 40. | Stick shaker and pusher activation |
| 41. | Windshear Detection |
| 42. | Throttle/power lever position |
| 43. | Additional Engine Parameters |
| 44. | Traffic Alert and Collision Avoidance System (TCAS) |
| 45. | DME 1 and 2 Distance |
| 46. | Nav 1 and 2 Selected Frequency |
| 47. | Selected barometric setting |
| 48. | Selected Altitude |
| 49. | Selected speed |
| 50. | Selected Mach |
| 51. | Selected vertical speed |
| 52. | Selected heading |
| 53. | Selected flight path |
| 54. | Selected decision height |
| 55. | EFIS display format |
| 56. | Multi-function/Engine Alerts Display format |
| 57. | Thrust command |
| 58. | Thrust target |
| 59. | Fuel quantity in CG trim tank |
| 60. | Primary Navigation System Reference |
| 61. | Ice Detection |
| 62. | Engine warning each engine vibration |
| 63. | Engine warning each engine over temp |
| 64. | Engine warning each engine oil pressure low |
| 65. | Engine warning each engine over speed |
| 66. | Yaw Trim Surface Position |
| 67. | Roll Trim Surface Position |
| 68. | Brake Pressure |
| 69. | Brake Pedal Application |
| 70. | Yaw or sideslip angle |
| 71. | Engine bleed valve position |
| 72. | De-icing or anti-icing system selection |
| 73. | Computed center of gravity |
| 74. | AC electrical bus status |
| 75. | DC electrical bus status |
| 76. | APU bleed valve position |
| 77. | Hydraulic Pressure |
| 78. | Loss of cabin pressure |
| 79. | Computer failure (critical flight and engine control systems) |
| 80. | Heads-up display |
| 81. | Para-visual display |
| 82. | Cockpit trim control input position-pitch |
| 83. | Cockpit trim control input position |
| 84. | Cockpit trim control input position |
| 85. | Trailing edge flap and cockpit flap control position |
| 86. | Leading edge flap and cockpit flap control position |
| 87. | Ground spoiler position and speed brake selection |
| 88. | All cockpit flight control input forces (control wheel, control column, rudder pedal) |
| 89. | Yaw damper status |
| 90. | Yaw damper command |
| 91. | Standby rudder valve status |
| 92. | Link performance |
| 93. | Signal-to-noise ratio |
| 94. | Error Rates |
| 95. | Link Degraded status |

Figure 2:
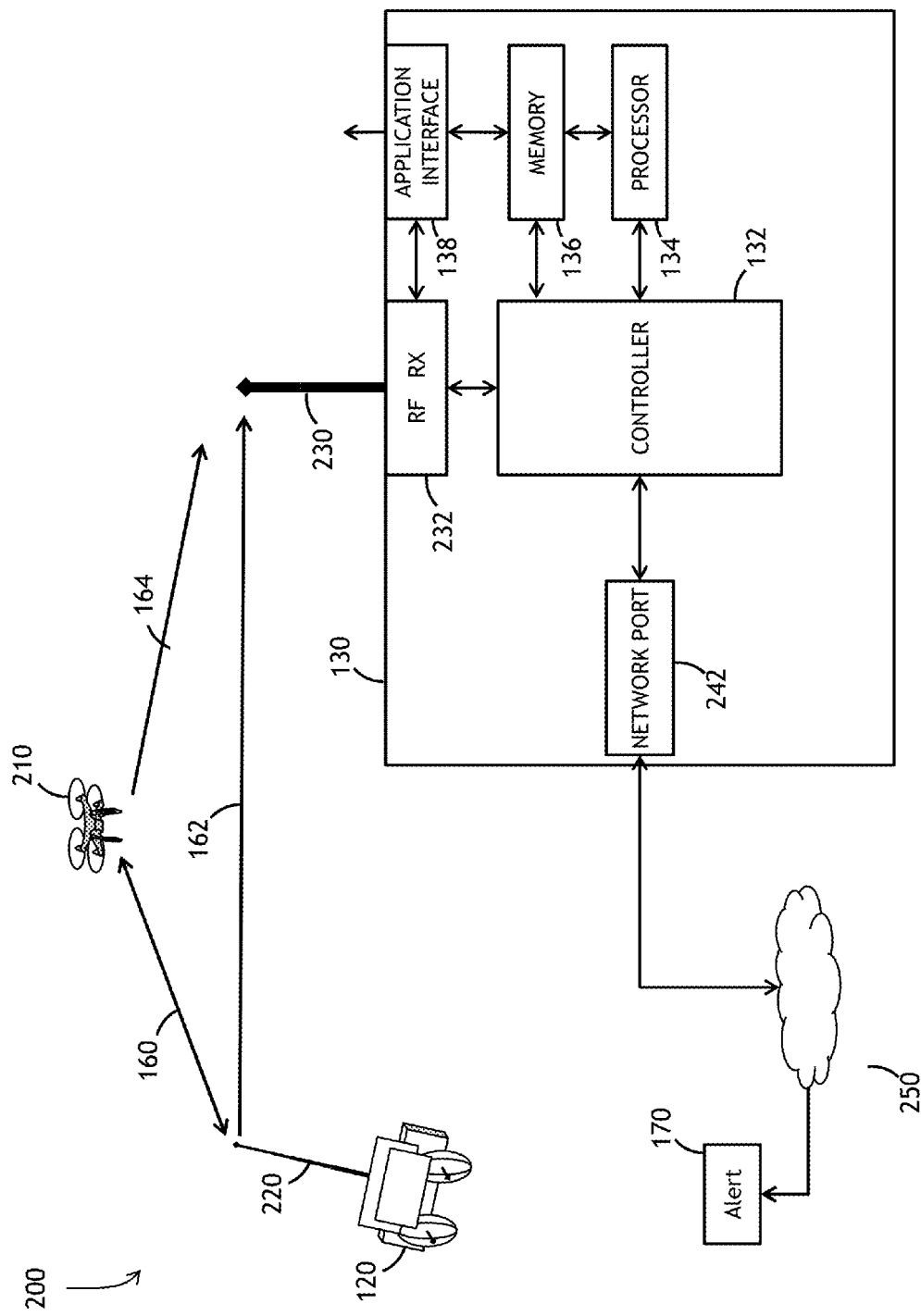
FIG. 2 is a diagram of an exemplary wireless system for RPV safety assurance via control and telemetry data recording in accordance with an embodiment of the inventive concepts disclosed herein.

Referring to FIG. 2, a diagram of an exemplary wireless system for RPV safety assurance via control and telemetry data recording in accordance with an embodiment of the inventive concepts disclosed herein is shown. The system 200 may include a wireless system configured to operate to receive RF signals associated with a wireless C2 data link 160 between the control station 120 and a Local Remotely Piloted Vehicle (LRPV) 210.

Here, the control station 120 may be fitted with a control station antenna 220 configured to transmit and receive the C2 data link 160 via a RF transmission and reception. As above, the C2 data link 160 may comprise both the command signals 162 as well as the telemetry data 164. The remote data recorder 130 may be configured with a remote data recorder antenna 230 configured for reception of both the command signals 162 generated by the control station 120 as well as the telemetry data 164 generated by the LRPV 210. Also, in this wireless configuration 200, the remote data recorder 130 may be configured with a remote data recorder radio frequency transmitter receiver 232 to receive and decode the RF signals.

In this wireless configuration 200, the C2 data link 160 may travel directly from the control station 120 to the LRPV 210 without traversing the remote data recorder 130. Here the remote data recorder 130 may operate overtly or covertly to gather the signals from each of the control station 120 and the LRPV 210.

The wireless C2 data link 160 may operate on a variety of frequencies. One goal of the inventive concepts disclosed herein is to allow frequency agility enabling the remote data recorder 130 to operate within any frequency band within which the C2 data link 160 may operate. For example, a C-Band (4 to 8 GHz), an L-Band (1 to 2 GHz) and each of the satellite Bands (IEEE radio bands X Ku K Ka and equivalent) may be some of the frequency bands wireless configuration 200 may function to receive and decode.

In embodiments, the controller 132 and radio frequency transmitter receiver 232 may operate in concert with processor 134 and memory 136 as a Software Defined Radio (SDR) configured for reception as well as transmission of the RF command signals 162 and the RF telemetry data 164.

Figure 3A:
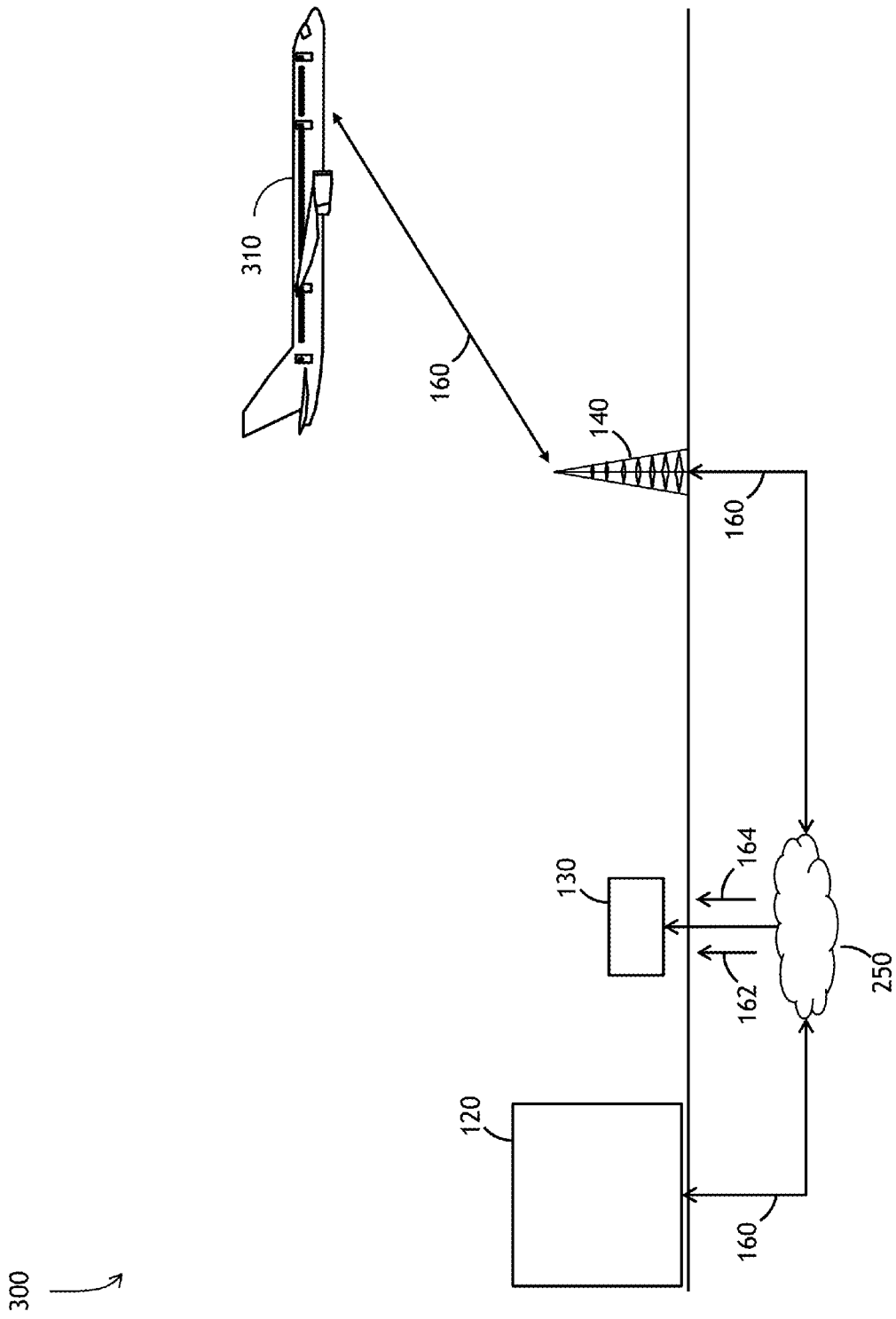
FIG. 3A is a diagram of an overview of a point to point terrestrial remote data recorder system exemplary of one embodiment of the inventive concepts disclosed herein.

Referring to FIG. 3A, a diagram of an overview of a point to point terrestrial remote data recorder system exemplary of one embodiment of the inventive concepts disclosed herein is shown. The system 300 may include a terrestrial point to point antenna 140 to relay the C2 data link 160 from a manned aerial vehicle 310 operating within range of the terrestrial point to point antenna 140.

In embodiments, the system 300 may operate to connect the remote data recorder 130 with the manned aerial vehicle 310 via the C2 data link 160. In a situation where the manned aerial vehicle 310 may be a manned and piloted aerial vehicle, the system 300 may operate to 1) record command data and state data as above, and 2) be ready to apply a command interface (e.g., aircraft flight control) with the flight control data bus onboard the manned aerial vehicle 310. For example, some aircraft may employ a primary flight control data bus (e.g., ARINC 429/629/664/AFDX/Mil-STD-1553 data bus) for transmission of flight control input from an cockpit onboard the manned aerial vehicle 310 to the flight control computers onboard the manned aerial vehicle 310. In embodiments, a situation may be present where a distressed manned aerial vehicle may request or be commanded to allow the remote data recorder 130 direct contact with the flight control data bus via the C2 data link 160.

For example, where the threat level may be associated with a G-induced or Hypoxia induced loss of consciousness situation, an onboard pilot may be unable to control the manned aerial vehicle 310. Here, the manned aerial vehicle 310 may automatically request direct contact via the C2 data link between the control station 120 and the primary flight control data bus via the remote data recorder 130. In this manner, the controller 132 may access the stored data within memory 136 and allow an offboard pilot within the control station 120 to provide input directly to the flight control computers onboard the manned aerial vehicle.

In addition, the system 300 recordation of the C2 data link 160 provided by the manned aerial vehicle 310 may enable the system 300 to provide data for a secondary application concerning aviation safety and maintenance analysis. The system 300 may provide a FOQA system with aggregated per fleet data enabling operational changes as well as operational safety analysis. Further, the system 300 may provide MOQA system with data aggregated on a per module basis to enable correlation of telemetry data with suspected failure data to pinpoint actual module failures versus false indications of a failure.

For example, each Boeing 757 may be fitted with avionics and communication systems to enable continuous C2 data link 160 communication with the remote data recorder 130. In this manner, the system 100 may record each aspect of each 757 flight and may aggregate the data for operator and manufacturer use. A FOQA system may, for example, analyze the aggregated data of each landing of each Boeing 757 to determine additional landing training requirements of 757 pilots.

Further, the C2 data link 160 may provide the system 300 with telemetry data associated with individual modules onboard the aerial vehicle. Each telemetry data 164 transmission may include a status of one or more systems onboard the manned aerial vehicle 310 as well as the RPV 110. For example, the telemetry data 164 may include a report of each hydraulic system quantity and pressure onboard the aerial vehicle. Should an aileron actuator fail and be reported to a maintenance organization, the maintenance organization may analyze the hydraulic system data recorded by the system 100 to determine a possible cause of the aileron actuator failure. In addition, the aileron actuator failure may be a false indication to a flight crew reporting the failure and accurate analysis of the aggregated the system 100 MOQA data may reveal the actual problem being a low hydraulic system quantity.

In addition, the system 300 aggregated data may be specifically configured for use by a safety analysis program. For example, an Aviation Safety Information Analysis and Sharing (ASIAS) system may realize a value within the system 300 aggregated data for safety analysis.

Figure 3B:
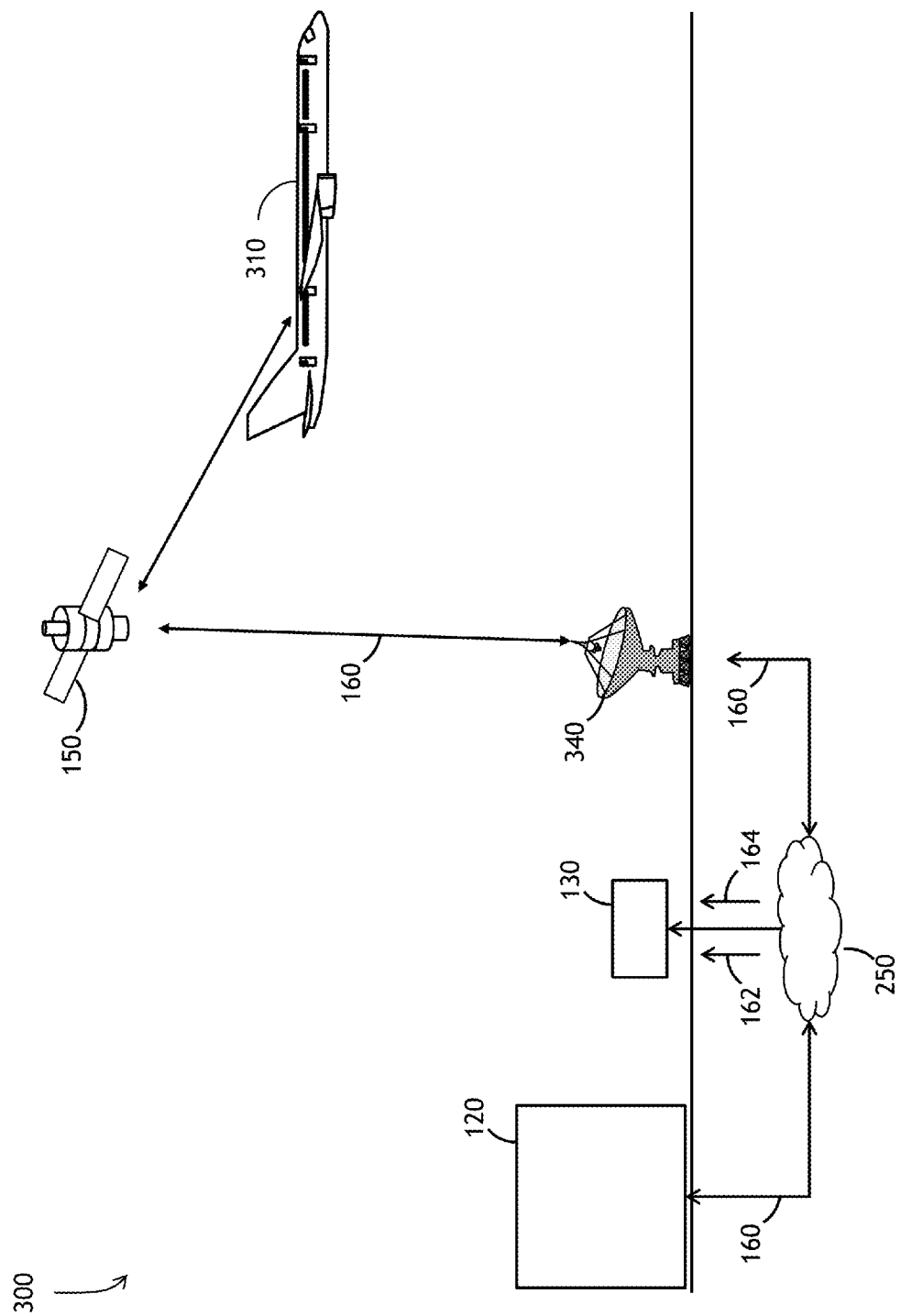
FIG. 3B is a diagram of an overview of a worldwide networked remote data recorder system exemplary of one embodiment of the inventive concepts disclosed herein.

Referring to FIG. 3B, a diagram of an overview of a worldwide networked remote data recorder system exemplary of one embodiment of the inventive concepts disclosed herein is shown. Transoceanic antenna 340 may route the C2 data link 160 beyond a line of sight to the distant RPV 310 via a satellite vehicle 150 in orbit.

Figure 4:
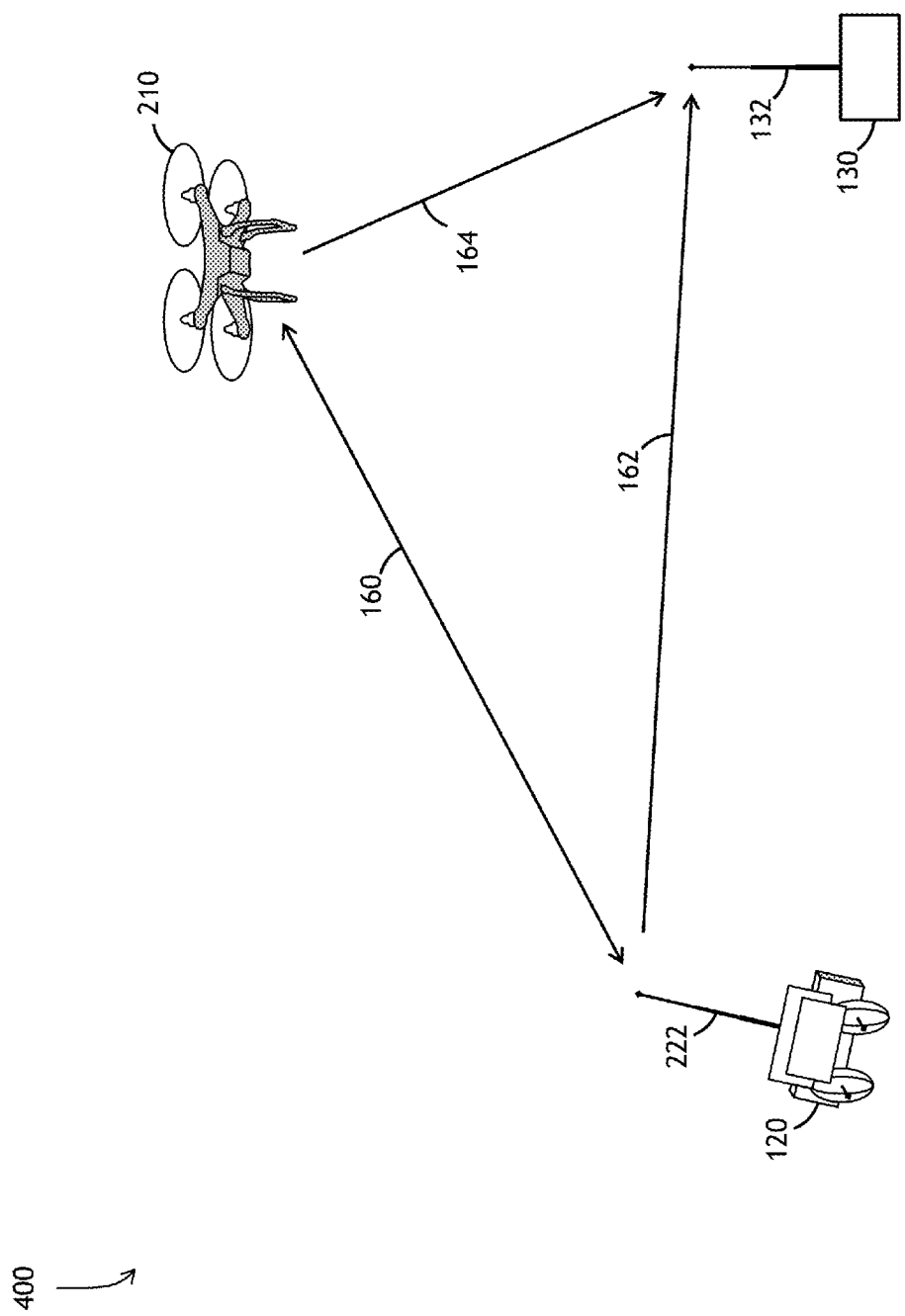
FIG. 4 is an diagram of a wireless remote data recorder system exemplary of one embodiment of the inventive concepts disclosed herein.

Referring to FIG. 4, a diagram of a wireless remote data recorder system exemplary of one embodiment of the inventive concepts disclosed herein is shown. A covert recordation embodiment 400 of the inventive concepts disclosed herein may enable recording of the C2 data link 160 without knowledge of an operator of control station 120. For example, the remote data recorder may be concealed from view of an operator of a control station 120 and specifically configured for covert reception of the C2 data link 160. For example, the remote data recorder may be physically located within a cellular antenna structure or behind a visual barrier.

Figure 5A:
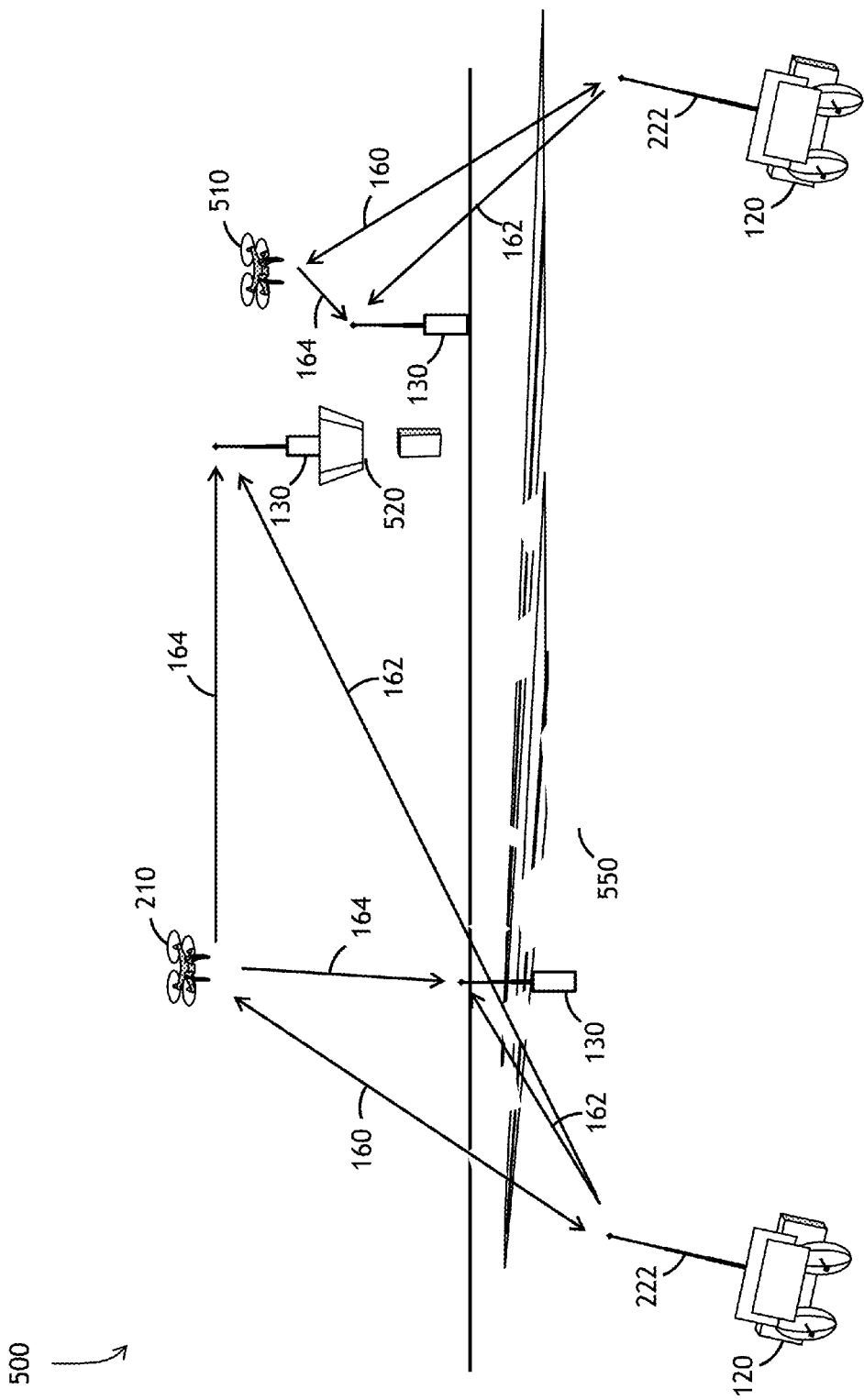
FIG. 5A is a diagram of a system for high value asset protection in accordance with one embodiment of the inventive concepts disclosed herein.

Referring to FIG. 5A, a diagram of a system for high value asset protection in accordance with one embodiment of the inventive concepts disclosed herein is shown. A high value asset configuration 500 may enable the remote data recorder 130 to provide protection of a high value asset 550 (here a runway environment).

One or more of the remote data recorder 130 may be placed in multiple locations proximal to the high value asset 550 to ensure accurate and possibly duplicate recordation of the C2 data link 160 between the control station 120 and the RPV 110. In one embodiment of the configuration 500, a remote data recorder 130 may be associated with a control tower 520 and able to record multiple streams of one or more C2 data links 160 between one or more control stations 120 and one or more RPVs 110.

The system 300 may further receive and record the telemetry data 164 and command signals 162 associated with a second RPV 510. In this example, a single or a plurality of remote data recorders 130 may be selectively placed around the HVA to 1) receive and record the telemetry data 164 and command signals 162 from a plurality of nearby RPVs and 2) analyze a threat level associated with the RPV whether the threat level is associated with the safety of the RPV 210 and 510 or the threat level is associated with proximity of each of the RPV 210 and 510 to the HVA 550.

As one analysis tool the system 100 may use in determining a threat level, the system 100 may use a Risk Class delineated by a governmental or international aviation authority. One such risk class may include a class of risk associated with a weight, an altitude capability and a speed capability of the RPV. For example, a RPV of greater weight, altitude and speed capability may pose a greater threat to the HVA 550. For example, the system 100 may enable the alert 170 should a RPV of the highest threat class (e.g. NATO class III) be operating within the class B airspace associated with an international airport HVA.

Figure 5B:
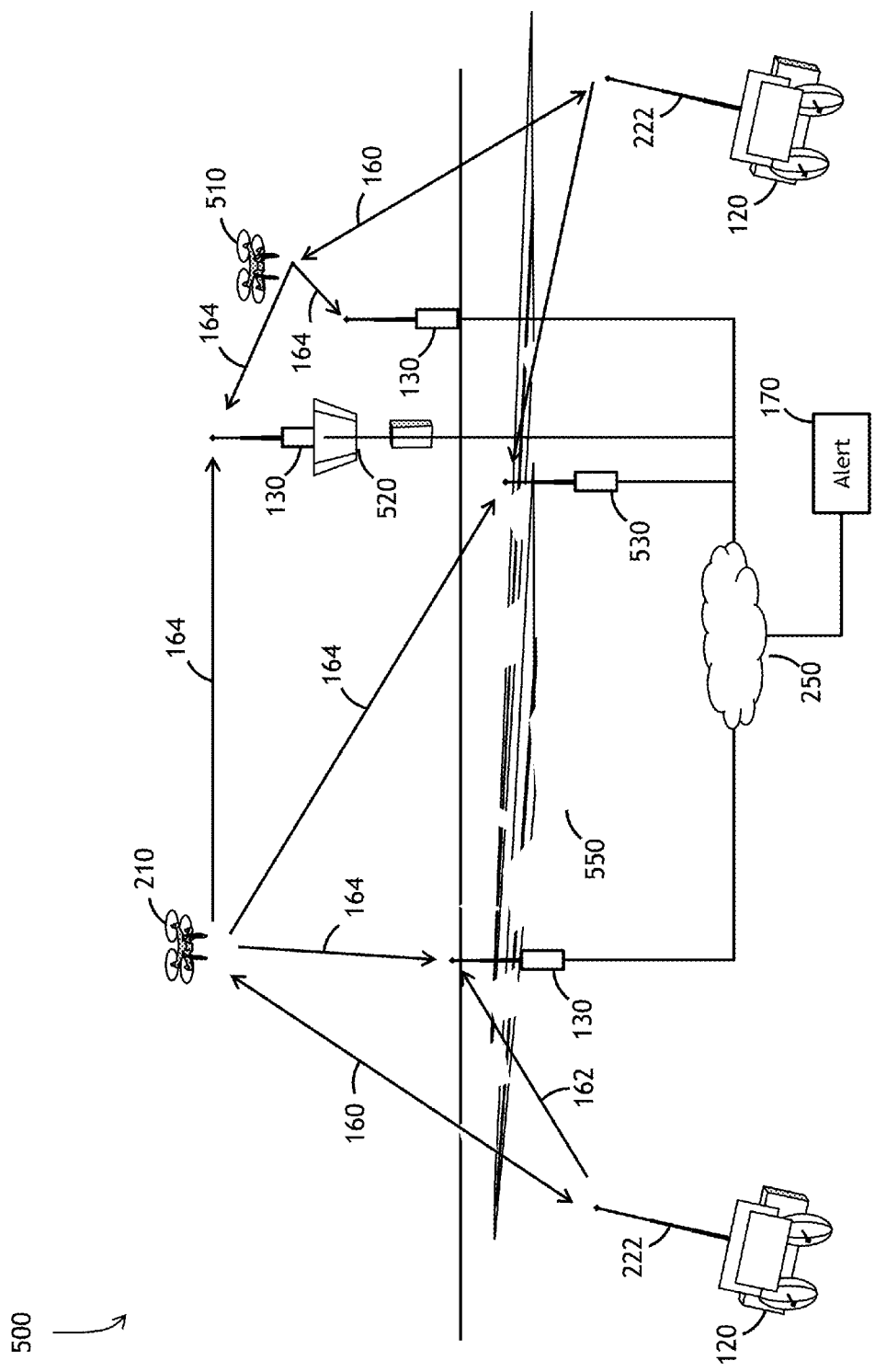
FIG. 5B is a diagram of a networked system for high value asset protection in accordance with one embodiment of the inventive concepts disclosed herein.

Referring to FIG. 5B, a diagram of a networked system for high value asset protection in accordance with one embodiment of the inventive concepts disclosed herein is shown. The networked high value asset configuration 500 may enable the multiple remote data recorders 130 to collaborate with one another to share data concerning each of the RPVs 110 within range of the individual remote data recorder 130. For example, a first remote data recorder 130 may receive and record the telemetry data 164 and command signals 162 contained within the C2 data link 160. As a first RPV may move away from the first remote data recorder 130 toward a second remote data recorder 530, the first remote data recorder 130 may transmit connectivity information to the second remote data recorder 530 to enable the second remote data recorder 530 to acquire and record the telemetry data 164 and command signals 162 from the first RPV 210.

In one example, the networked high value asset configuration 500 may share RPV connectivity information between a plurality of remote data recorders 130. For example, a RPV location and heading, a frequency of the C2 data link 160 in use by the RPV frequency, a presence of a second RPV 510 operating in the vicinity, a ground speed and a closure with the HVA may be some of the connectivity information shared between the networked remote data recorders 130.

Figure 6:
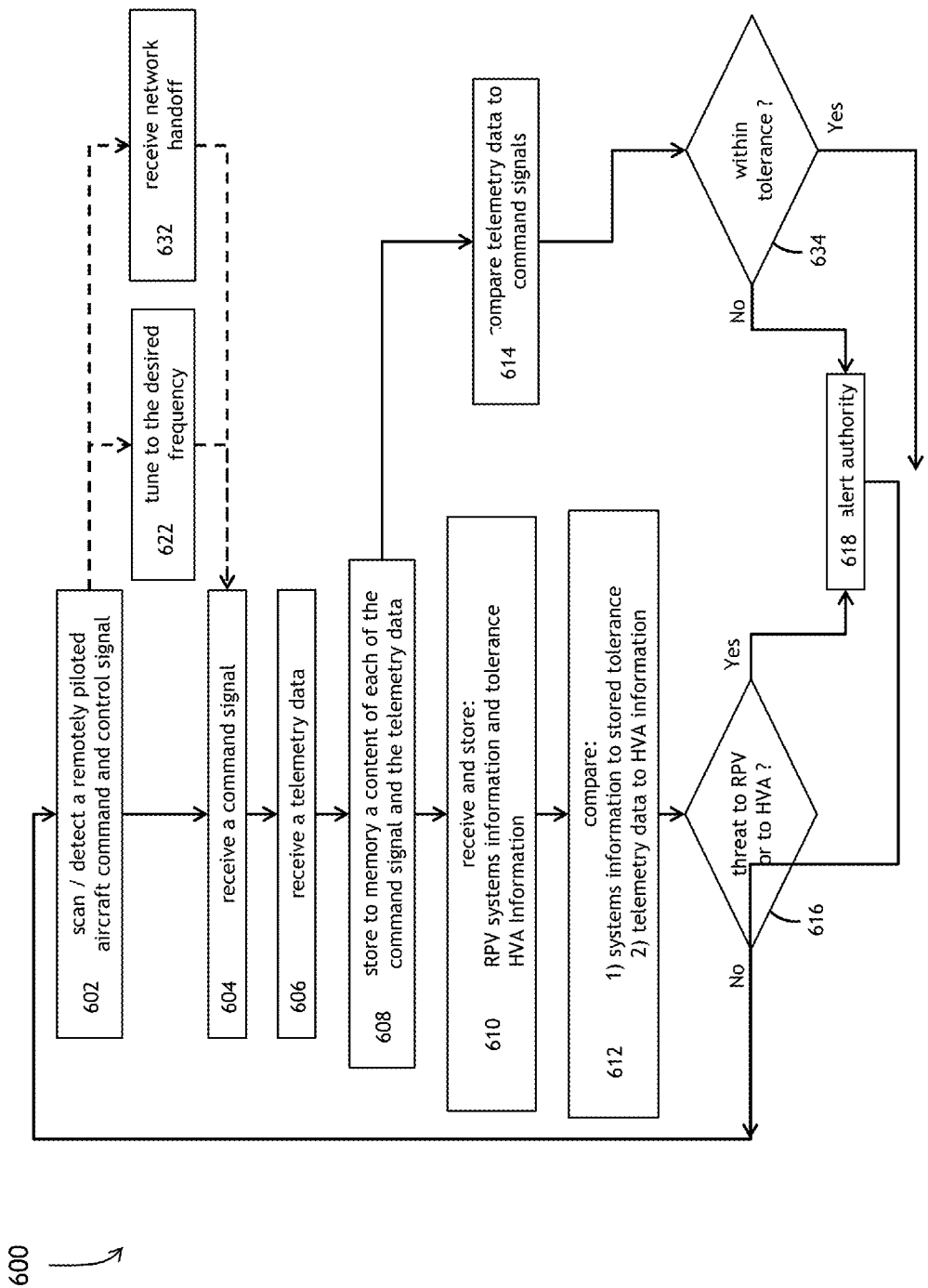
FIG. 6 is a flowchart of a method for remote data recordation exemplary of one embodiment of the inventive concepts disclosed herein.

Referring to FIG. 6, a flowchart of a method for remote data recordation exemplary of one embodiment of the inventive concepts disclosed herein is shown. Method 600 may begin at a step 602, with scan and/or detect a RPV C2 signal, and at a step 622 optionally tune to one or more desired frequencies to receive the C2 signal. Additionally and optionally, at a step 632, method 600 may receive a network handoff from an additional networked remote data recorder. At a step 604, the method 600 may receive a command signal and further receive telemetry data at a step 606.

Method 600 may, at a step 608, record to memory a content of each of the command signal and the telemetry data. At a step 614, the method may compare the received telemetry data to the command signals, and, at a step 634, if the comparison reveals the telemetry data is within a tolerance of the command signals, the method may return to step 602. However, if the comparison 634 reveals telemetry data outside of the tolerance, the method may, at a step 618, alert an authority for corrective action and return to the step 602 to continue operation.

At a step 610 the method may receive and store both 1) information concerning a high value asset and 2) information and tolerances associated with a system onboard the RPV. At a step 612, the method may compare the systems information to a stored tolerance and compare the telemetry data to the HVA information. A step 616 may query if the comparison 612 reveals a threat to the RPV or to the HVA. If the answer to query 616 is negative, the method may return to the step 602 and scan/detect additional signals. However, if the answer to query 616 is positive, the method may proceed to the step 618 with alerting an authority to the threat associated with the RPV and/or the HVA. For example, a runway environment may be one example of a HVA from which an authority may desire protection from the threat of a presence of a RPV within an approach corridor. Should a RPV be present within the approach corridor of the runway, system 100 may alert the authority of the RPV presence to enable aircraft landing on the runway to mitigate the threat with alternate procedures.

In an additional example, should the comparison 612 of stored systems information to currently received telemetry data reveal a current spike in oil pressure, the threat level may be associated with the high oil pressure being a threat to the safety of the RPV. Here, the system 100 may alert a maintenance authority to the presence of the oil pressure threat to the RPV and the maintenance authority may take appropriate action.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for remotely piloted aerial vehicle telemetry recording, comprising:
  a remote data recorder including a wired port and a wireless port, the remote data recorder configured for:
    detecting at least one Command and Control (C2) signal destined for at least one Remotely Piloted Vehicle (RPV) located remotely from the remote data recorder, the C2 signal transmitted via one of: a wired connection and a wireless radio frequency (RF) signal, the C2 signal operatively connecting a control station and the at least one RPV;
    receiving a command signal via one of: the wired port and the wireless port, the command signal 1) generated by the control station, 2) destined for the at least one RPV, 3) including at least one associated RPV command, and 4) a portion of the C2 signal;
    receiving a telemetry data signal via one of: the wired port and the wireless port, the telemetry data signal 1) generated by the at least one RPV, 2) destined for the control station, 3) including at least one associated RPV result, and 4) a portion of the C2 signal;
a controller operatively coupled with the remote data recorder and with a memory, the memory storing non-transitory computer readable program code for processing the command signal and the telemetry data associated with the at least one RPV, the computer readable program code comprising instructions for causing the controller to perform and direct the steps of:
receiving the command signal and the telemetry data;
receiving system parameters associated with at least one system onboard the at least one RPV;
storing each of the command signal, the telemetry data, and the system parameters in the memory;
comparing the at least one associated RPV result to 1) the at least one associated RPV command and 2) to the stored system parameters;
determining a threat level associated with the at least one RPV, the threat level determined based on the comparing; and
alerting an authority if the threat level rises above a predetermined threshold.

2. The system for remotely piloted aerial vehicle telemetry recording of claim 1, wherein the at least one RPV is at least one of an unmanned aerial vehicle and a manned aerial vehicle.

3. The system for remotely piloted aerial vehicle telemetry recording of claim 1, wherein the telemetry data includes at least one of a RPV position, a RPV altitude, a heading, a speed and status associated with at least one system onboard the at least one RPV.

4. The system for remotely piloted aerial vehicle telemetry recording of claim 1, wherein the command signal and the at least one associated RPV command are generated by an operator of the control station.

5. The system for remotely piloted aerial vehicle telemetry recording of claim 1, wherein the controller is further configured for:
receiving and storing High Value Asset (HVA) information associated with at least one HVA external to the at least one RPV;
comparing the HVA information to the telemetry data; and
determining the threat level associated with the at least one RPV based on the comparing.

6. The system for remotely piloted aerial vehicle telemetry recording of claim 5, wherein the threat level associated with the at least one RPV is associated with one of: 1) a threat to the at least one RPV, 2) a threat to the HVA external to the at least one RPV from a presence of the at least one RPV, 3) a threat to the at least one RPV from a system onboard the at least one RPV, and 4) a threat to a person onboard the at least one RPV.

7. The system for remotely piloted aerial vehicle telemetry recording of claim 1, wherein comparing the at least one associated RPV command to the at least one associated RPV result further comprises a comparison of stored telemetry data with received telemetry data and a comparison of a RPV system desired performance with a RPV system current performance.

8. A method for remotely piloted aerial vehicle telemetry recording, comprising:
detecting, within a remote data recorder, at least one Command and Control (C2) signal destined for at least one Remotely Piloted Vehicle (RPV) located remotely from the remote data recorder, the detecting by a receiver offboard the at least one RPV, the remote data recorder configured with a wired port and a wireless port, the C2 signal operating within one of: a wired connection and a wireless radio frequency (RF) signal, the C2 signal operatively connecting a control station and the at least one RPV;
receiving a command signal via one of: the wired port and the wireless port, the command signal 1) generated by the control station, 2) destined for the at least one RPV, 3) including at least one associated RPV command, and 4) a portion of the C2 signal;
receiving a telemetry data signal via one of: the wired connection within the receiver and on the wireless RF signal via the receiver antenna, the telemetry data signal 1) generated by the at least one RPV, 2) destined for the control station 3) including at least one associated RPV result, and 4) a portion of the C2 signal;
receiving the command signal and the telemetry data via a controller operatively coupled with the remote data recorder and with a memory, the memory storing non-transitory computer readable program code for processing the command signal and the telemetry data associated with the at least one RPV, the computer readable program code comprising instructions for causing the controller to perform and direct the steps of:
receiving system parameters associated with at least one system onboard the at least one RPV;
storing each of the command signal, the telemetry data, and the system parameters in the memory;
comparing the received at least one associated RPV result to 1) the at least one associated RPV command and 2) to the stored system parameters;
determining a threat level associated with the at least one RPV, the threat level determined based on the comparing; and
alerting an authority if the threat level rises above a predetermined threshold.

9. The method of claim 8, wherein the at least one RPV is at least one of an unmanned aerial vehicle and a manned aerial vehicle.

10. The method of claim 8, wherein the telemetry data is at least one of a RPV position, a RPV altitude, a heading, a speed and status associated with at least one system onboard the at least one RPV.

11. The method of claim 8, wherein the command signal and the at least one associated RPV command are generated by an operator of the control station.

12. The method of claim 8, further including:
receiving High Value Asset (HVA) information associated with a HVA external to the at least one RPV, the receiving includes reception via one of a wireless data connection, a wired data connection and a periodic data transfer to the memory;
storing the HVA information in the memory;
comparing the received telemetry data to the HVA information; and
determining the threat level associated with the at least one RPV based on the comparing.

13. The method of claim 8, wherein the threat level is associated with one of: 1) a threat to the at least one RPV, 2) a threat to the HVA external to the at least one RPV from a presence of the at least one RPV, 3) a threat to the at least one RPV from a system onboard the at least one RPV, and 4) a threat to a person onboard the at least one RPV.

14. The method of claim 8, wherein comparing the received command signal and the received telemetry data to the stored system parameters further comprises a comparison of stored telemetry data with received telemetry data and a comparison of a RPV system desired performance with a RPV system current performance.

15. A method for quality assurance tracking of an aerial vehicle comprising:
- detecting at least one Command and Control (C2) signal destined for at least one Remotely Piloted Vehicle (RPV), the C2 signal operatively connecting a control station and the at least one RPV;
- extracting from the detected C2 signal and storing to a memory, a command signal 1) generated by the control station, 2) destined for the at least one RPV, 3) including at least one associated RPV command, and 4) a portion of the C2 signal;
- extracting from the detected C2 signal and storing to the memory, a telemetry data signal 1) generated by the at least one RPV, 2) destined for the control station, 3) including at least one associated RPV result, and 4) a portion of the C2 signal;
- receiving and storing system parameters and operational parameters associated with at least one system onboard the at least one RPV;
- comparing the at least one associated RPV result to 1) the at least one associated RPV command and 2) to the stored system parameters;
- determining a threat level associated with the at least one RPV, the threat level determined based on the comparing; and
- alerting an authority if the threat level rises above a predetermined threshold.

16. The method for quality assurance tracking of an aerial vehicle of claim 15, wherein the at least one RPV is at least one of an unmanned aerial vehicle and a manned aerial vehicle.

17. The method for quality assurance tracking of an aerial vehicle of claim 15, wherein the telemetry data is at least one of a RPV position, a RPV altitude, a heading, a speed and status associated with at least one system onboard the at least one RPV.

18. The method for quality assurance tracking of an aerial vehicle of claim 15, wherein the stored telemetry data is further aggregated by at least one of an aircraft type, an aircraft model, an aircraft manufacturer and a pilot training facility.

19. The method for quality assurance tracking of an aerial vehicle of claim 15, wherein the telemetry data is received from a plurality of unmanned and manned aerial vehicles.

20. The method for quality assurance tracking of an aerial vehicle of claim 15, wherein the threat level is associated with one of: a threat to the at least one RPV from a system onboard the at least one RPV, a threat to a High Value Asset (HVA) external to the at least one RPV from a presence of the at least one RPV, and a threat to a person onboard the at least one RPV.

* * * * *